United States Patent [19]

Jönsson et al.

[11] Patent Number: 4,622,665

[45] Date of Patent: Nov. 11, 1986

[54] SYNCHRONIZING SYSTEM

[75] Inventors: Stig R. E. Jönsson, Stockholm; Lars-Erik A. Larsson, Norsborg, both of Sweden

[73] Assignee: Telefonaktiebolaget LM Ericsson, Stockholm, Sweden

[21] Appl. No.: 610,292

[22] PCT Filed: Sep. 14, 1983

[86] PCT No.: PCT/SE83/00327

§ 371 Date: May 4, 1984

§ 102(e) Date: May 4, 1984

[87] PCT Pub. No.: WO84/01247

PCT Pub. Date: Mar. 29, 1984

[30] Foreign Application Priority Data

Sep. 20, 1982 [SE] Sweden .............................. 8205365

[51] Int. Cl.[4] ............................................. H04J 3/06
[52] U.S. Cl. ...................................... 370/100; 375/110
[58] Field of Search ............... 370/100, 103; 375/110, 375/118

[56] References Cited

U.S. PATENT DOCUMENTS 3,869,579 3/1975 Karl ..................................... 370/103
3,936,604 2/1976 Pommerening ..................... 370/103
4,042,781 8/1977 Dragotinov ........................ 370/103
4,074,080 2/1978 Dragotinov et al. .............. 370/103
4,075,428 2/1978 Ghisler et al. ..................... 370/103
4,339,817 7/1982 Hata et al. .......................... 370/103

Primary Examiner—Douglas W. Olms
Assistant Examiner—Kenneth I. Rokoff
Attorney, Agent, or Firm—Roberts, Spiecens & Cohen

[57] ABSTRACT

Each of a plurality of stored program controlled stations associated with a digital telecommunication network includes: a plurality of clocks and an adjustable oscillator for generating transmission pulses used in a local station and adjacent stations; a phase difference meter for determining, with the aid of a clock selector, phase differences between the pulses of the oscillator and the clock pulses; and a plurality of regulation value generators which are connected via a regulation value generator selector to the phase difference meter. Each generator converts in accordance with a network synchronizing method, determined phase differences to regulation values for regulating the oscillator. The program memories of the stations include reprogrammable selection memories to store control information by which the network synchronizing method is selected and by which the clock selectors and generator selectors are controlled such that the oscillators are synchronized in accordance with the selected method.

2 Claims, 1 Drawing Figure

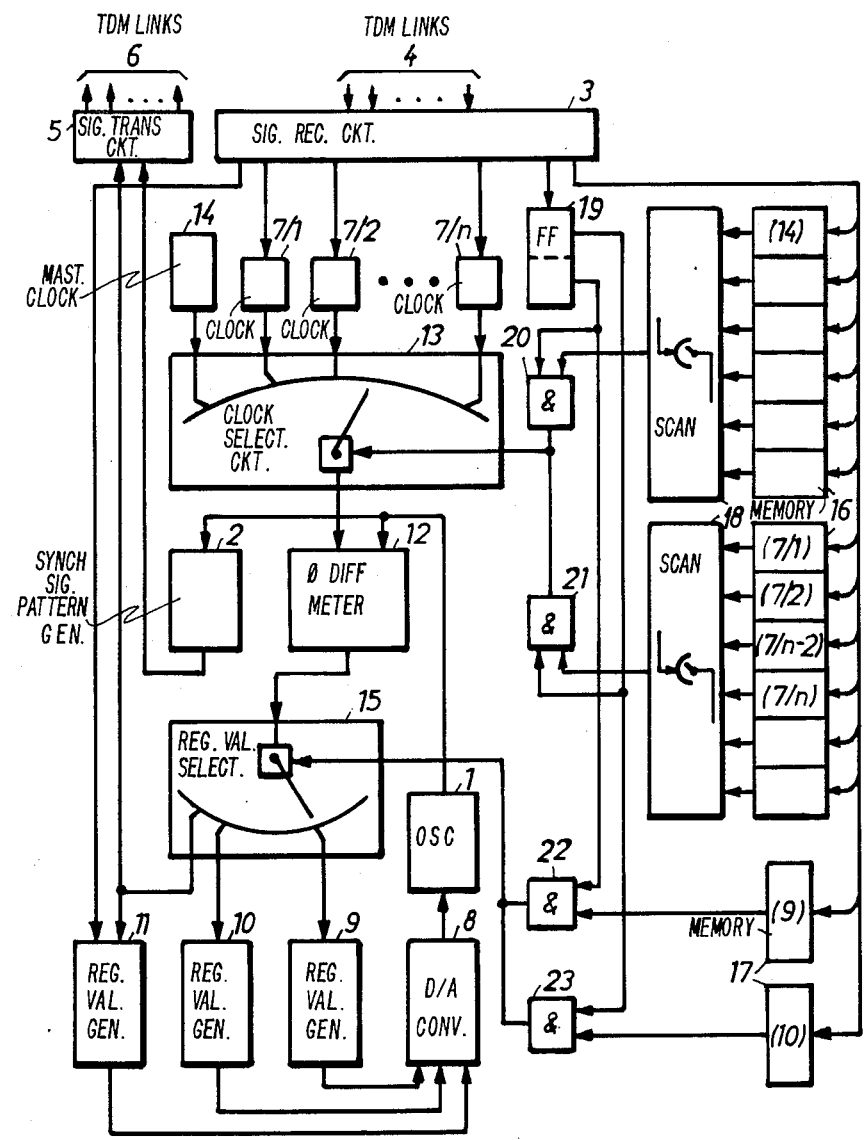

SYNCHRONIZING SYSTEM

FIELD OF INVENTION

The present invention relates to a synchronizing system for synchronizing stored program controlled digital telecommunication stations, according to a synchronizing method selected from a plurality of methods known per se. The stations are interconnected by means of time-division-multiplex (TDM) links. Each station includes an oscillator provided with a frequency regulation input, for generating a transmission pulse swinging about a normal clock pulse, a plurality of adjacent clocks for generating bit pulses at which the station receives information transferred on associated TDM links, a phase difference meter for determining, in accordance with one of said synchronizing methods, phase differences, between the oscillator transmission pulse and the bit pulses of the clocks, and a regulation value generator for converting said phase differences to values for regulating the oscillator frequency.

BACKGROUND

U.S. Pat. No. 4,075,428 describes an apparatus, in a stored program controlled telecommunication station, for generating regulation values according to a given synchronizing method, said values being transmitted to the frequency regulation input of the station oscillator. The known apparatus includes a digital filter and a memory which stores weight factors, each of which is assigned to one of a number of clocks as well as an algorithm for averaging with the aid of the filter and the weight factors, a number of phase differences between pulses from the station oscillator and the clocks. A change of the network synchronizing method is obtained by changing the memory contents.

It is also known, e.g. from a paper No. 132-1 "Transition to a digital telephone network" which was read at the 1976 International Switching Symposium in Kyoto, Japan, to synchronize a digital stored program controlled telecommunication network with the aid of a method suited to the size of the network and the standard of communication, and to change the synchronizing method at certain occasions, e.g. in conjunction with extending the network or improving its standard. Such a synchronizing method change affects the whole network in question and has so far required rather extensive alterations in all the stations of thereof. Even though apparatus according to said U.S. patent are used, a synchronizing method change includes altering the extensive contents in the program memories of the communication network. Such alterations are difficult to carry out without disturbing network operation.

SUMMARY OF INVENTION

It is an object of the invention to provide an improved synchronizing system for telecommunication systems.

As will be shown in greater detail hereinafter synchronizing system provided in accordance with the invention enables changing between a plurality of network synchronizing methods known per se without suffering operational disturbances. Digital stored program controlled stations are provided with a standard such that various synchronizing principles are feasible at any time. In each station there is arranged a plurality of regulation value generators each associated with its own principle. During each network operational period, the synchronizing method best suited to the occasion is selected with the aid of a few specifications characteristic of the principle. In addition to the regulation value generator in question, these specifications indicate the clocks affecting the phase difference averaging according to the selected principle, and are stored as control information in the program memory of the network.

BRIEF DESCRIPTION OF DRAWING

The invention will be explained hereinafter with reference to the appended drawing, wherein the sole FIGURE illustrates part of a network synchronizing system provided in accordance with the invention and included in a stored program controlled digital telecommunication station having a plurality of adjacent clocks and a master clock.

DETAILED DESCRIPTION OF THE INVENTION

An individual station included in a digital telecommunication network does not need to know itself how adjacent stations utilize, for network synchronization, the transmission clock pulse conventionally generated by its ocillator 1 and synchronizing signal pattern generator 2. On the other hand, central network control is needed to determine the current network synchronizing principle. Such central network control information is received conventionally by each station with the aid of its own signal reception means 3 via signalling channels on TDM links 4 which are used for transferring information coming to the station. Each station also includes a conventional signal transmission means 5, connected to said signal pattern generator 2 and signalling channels on TDM links 6 for transferring information departing from the station. The signal reception means 3 is connected to conventional adjacent clocks 7/1 ... 7/n, each of which generates it own bit pulse at which the station receives information via an associated TDM link 4 with transmission direction towards the station.

Said oscillator 1 is provided with an input for receiving analog frequency regulation voltage values obtained with the aid of a digital-analog (D/A) converter 8, from digital regulation values, each of which is generated during a regulation interval by one of a plurality of regulation value generators 9–11. The oscillator pulse is transferred to one input of a digital phase difference meter 12, the other input of which is connected to clock selector 13. The drawing illustrates a station which includes a master clock 14 having a stable frequency used in conventional so-called despotic synchronization for generating the normal clock pulse of the network. The master clock at each of the adjacent clocks of the station 7/1 ... 7/1, has its output connected to an associated input of the clock selector 13. A digital value denoting the momentary phase difference between the station transmission clock pulse and the bit pulse received via the clock selector is obtained on the output of the phase difference meter. A constant phase difference value associated with the same clock denotes that frequency synchronization exists between the compared pulses. Each of the stations of the telecommunication network includes a regulation value generator selector 15 with the aid of which, in the embodiment illustrated in the drawing, the output of the phase difference meter is connected to an input on one of the regulation value generators 9–11, which each uses its own conventional synchronizing principle to convert phase difference values determined according to this principle to digital frequency regulation values.

No detailed description of conventional synchronizing principles is needed to understand the proposed synchronizing system. All the principles have in common that the relevant regulation value generator receives a plurality of phase difference values during each regulation interval. In the mentioned despotic synchronization, a frequency regulation value calculation is carried out with the aid of generator 9 on the basis of a single phase difference value received from the phase difference meter 12. In so-called mutal single-ended synchronization, the calculation of a frequency regulation value is carried out with the aid of generator 10 on the basis of a plurality of phase difference values received from the phase difference meter 12. In so-called mutual double-ended synchronization the calculation of a frequency regulation value is carried out with the aid of generator 11 on the basis of a first plurality of phase difference values which are generated by the station phase difference meter 12, and a second plurality of phase difference values generated by the adjacent stations and received via the aforementioned signal reception means 3. In the drawing, it is shown that for mutual double-ended synchronization the first plurality of phase difference values is transmitted via the aforementioned signal transmission means 5 to the adjacent stations.

For selecting a current network synchronizing principle, in the proposed synchronizing system, there is transmitted to each station first control information for controlling the station clock selector 13 and selecting the current clocks, as well as second control information for controlling the station regulation value generator selector 15 upon selection of the generator in question. The specifications of said first and second control information are stored in a doubled reprogrammable first and second selection memory 16 and 17, respectively, included in the station program memory, but illustrated in the drawing as separate memories for the sake of clarity. The first selection memory 16 is thereby provided with a scanning means 18 for cyclic specification reading, one cycle per regulation interval.

By doubling the selection memories there is enabled selection between two synchronizing methods, e.g. with the aid of a flip-flop 19 and and AND gates 20–23. In the drawing, it is indicated that the setting of the flip-flop and writing-in of control information in the selection memories is carried out conventionally via signal reception means 3. It is further depicted that the memories store synchronizing specifications associated with two different methods. With the aid of a specification sequence "(7/1), (7/2), (7/n−2), (7/n)" stored in the memory 16, the clock selector 13 is controlled such that, for example, the phase difference meter 12 receives bit pulses from the adjacent clocks 7/1 and 7/2 and 7/2 and 7/n−2 and 7/n during a regulating interval. The generator selector 15 is controlled with the aid of a specification "(9)" stored in the memory 17 such that, for example, the phase difference meter 12 is connected to generator 9.

If it is assumed that the flip-flop 19 activates the gates 20 and 22 during a first network operation period, the network is synchronized during this period with the aid of despotic synchronization, the station illustrated in the drawing being used as master station. A change of state of the flip-flop 19 then results in activation of the gates 21 and 23 and initiates a second network operation period with mutual single-ended synchronization in association with the adjacent clocks 7/1, 7/2, 7/n−2 and 7/n. With the aid of state change of the station flip-flops there is obtained interruption-free change between two network synchronizing methods.

The system of the invention is characterized in that it enables trouble-free changing between a plurality of known synchronizing methods by changing between the associated regulation value generators included in each station. For example, the loop filter known from U.S. Pat. No. 4,075,428 constitutes a regulation value generator fit for use in the synchronizing system according to the present invention. The changing between the available synchronizing methods is carried out by means of the clock selector and the regulation value generator selector, arranged in each of the stations, and by means of reprogrammable method selection memories included in the program memories controlling the stations.

What is claimed is:

1. A system comprising a plurality of stored program controlled digital telecommunication stations adapted for being synchronized and including program memory means, time-division-multiplex (TDM) links means for synchronizing said stations, each of said station including an oscillator including a frequency regulation input for generating a transmission pulse swinging about a normal clock pulse, a plurality of clocks for generating bit pulses and to which information is transferred from the associated TDM links means, a phase difference meter for determining phase differences between the oscillator transmission pulse and the bit pulses of the clocks, a regulation value generator for converting said phase differences to values for regulating the oscillator frequency, a clock selector including inputs connected to the clocks and an output connected to the phase difference meter, regulation value generators which individually convert determined clock pulse phase differences to regulation values which are sent to said frequency regulation input of said oscillator, and a regulation value generator selector for activating one of said generators, the program memory means of the stations including reprogrammable selection memories coupled to said clock selector and to said regulation value generator selector for storing control information whereby the clock selectors and regulation value generator selectors of the stations of the system are controlled such that the oscillators of the stations are synchronized.

2. A system as claimed in claim 1, wherein one of the stations includes a master clock for generating said normal clock pulse, said master clock being connected to the associated clock selector.

* * * * *